United States Patent [19]

Wiley, Jr.

[11] 4,155,570

[45] May 22, 1979

[54] REAR WHEEL SUSPENSION SYSTEM FOR STRADDLE CARRIERS

[75] Inventor: James G. Wiley, Jr., Yakima, Wash.

[73] Assignee: Matter, Inc., Yakima, Wash.

[21] Appl. No.: 806,856

[22] Filed: Jun. 15, 1977

[51] Int. Cl.² .............................................. B60G 5/02
[52] U.S. Cl. .................................... 280/677; 414/459
[58] Field of Search ............... 280/677, 678, 683, 679, 280/680, 681; 214/392

[56] References Cited

U.S. PATENT DOCUMENTS

| 2,754,131 | 7/1956 | Tulin | 280/677 |
| 3,031,203 | 4/1962 | Christenson | 280/680 |
| 3,774,934 | 11/1973 | McGee | 280/678 |

Primary Examiner—Joseph F. Peters, Jr.
Assistant Examiner—John A. Carroll
Attorney, Agent, or Firm—B. P. Fishburne, Jr.

[57] ABSTRACT

To simplify, lighten and reduce the cost of the rear wheel suspension on straddle carriers while increasing the operational efficiency of the suspension, a longitudinal walking beam is swingably mounted at its center on a transverse axis trunnion secured to a sturdy depending box beam on the straddle carrier frame. Rear wheel axle assemblies for pairs of tandem rear wheels are carried by the forward and rear ends of the walking beam. Shock struts are interconnected between the forward and rear ends of the walking beam and sturdy holders on the interior of the depending box beam in upwardly converging relationship for efficient operation. The shock struts can be hydraulic, air operated or mechanical with coil springs and cables.

3 Claims, 7 Drawing Figures

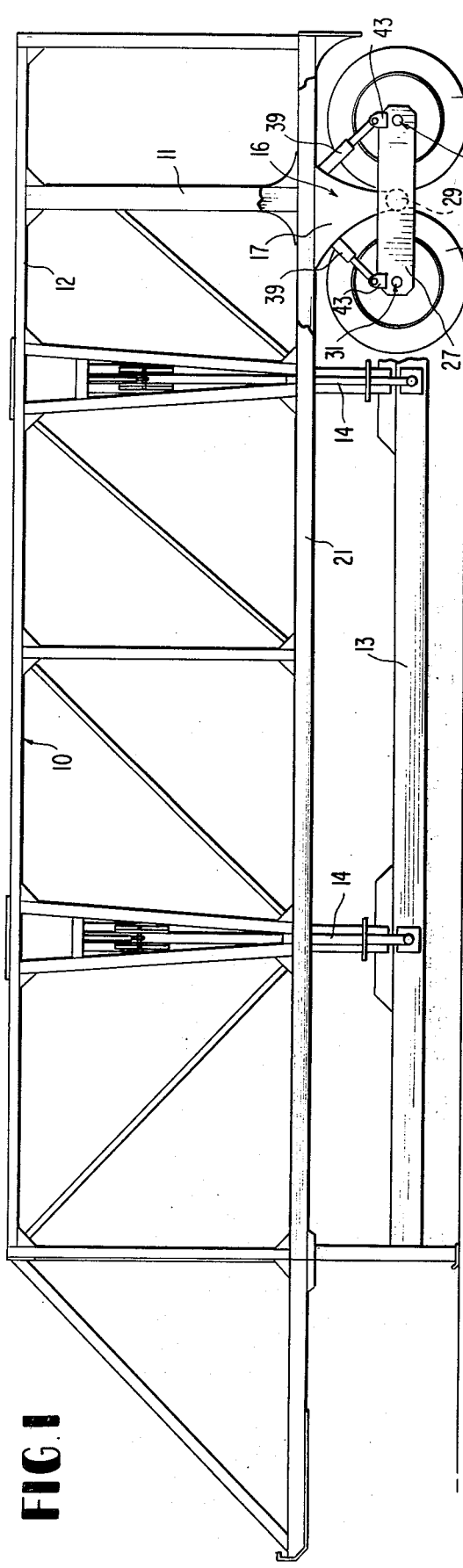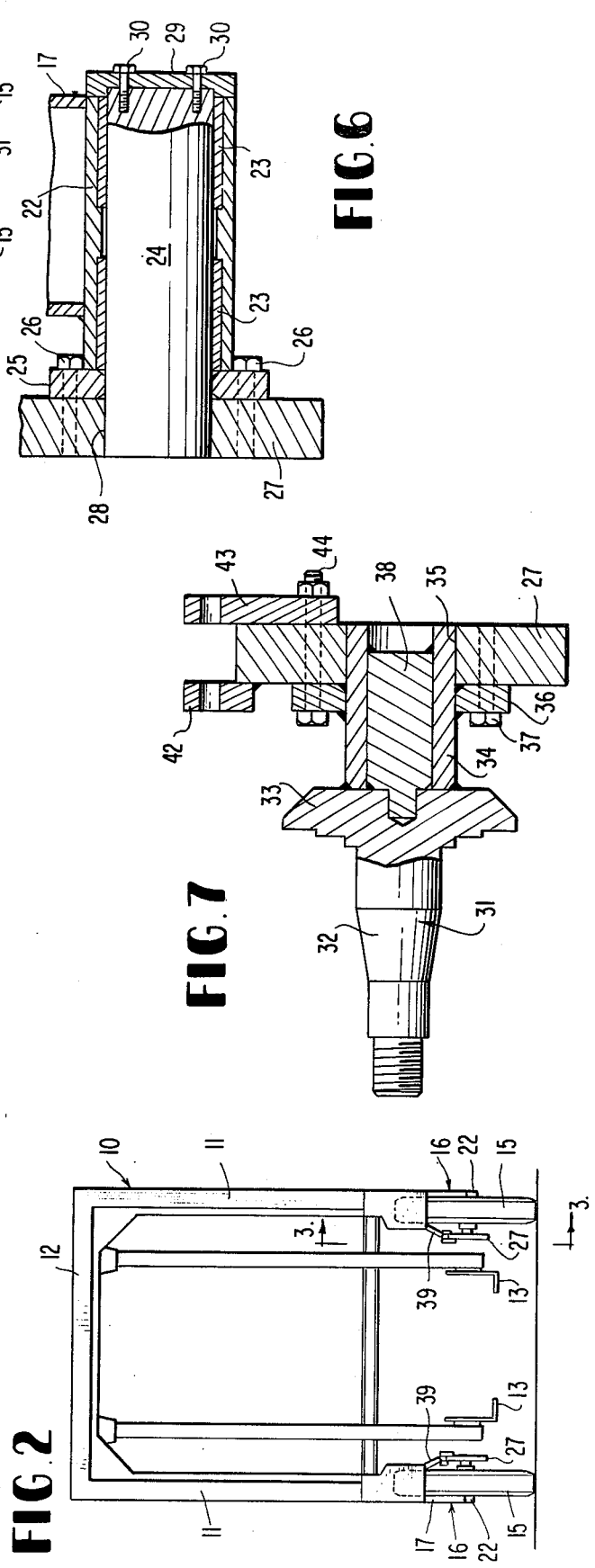

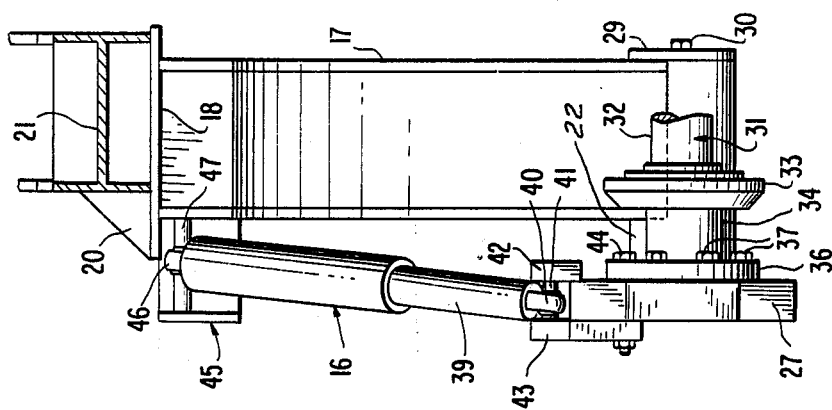
FIG.4
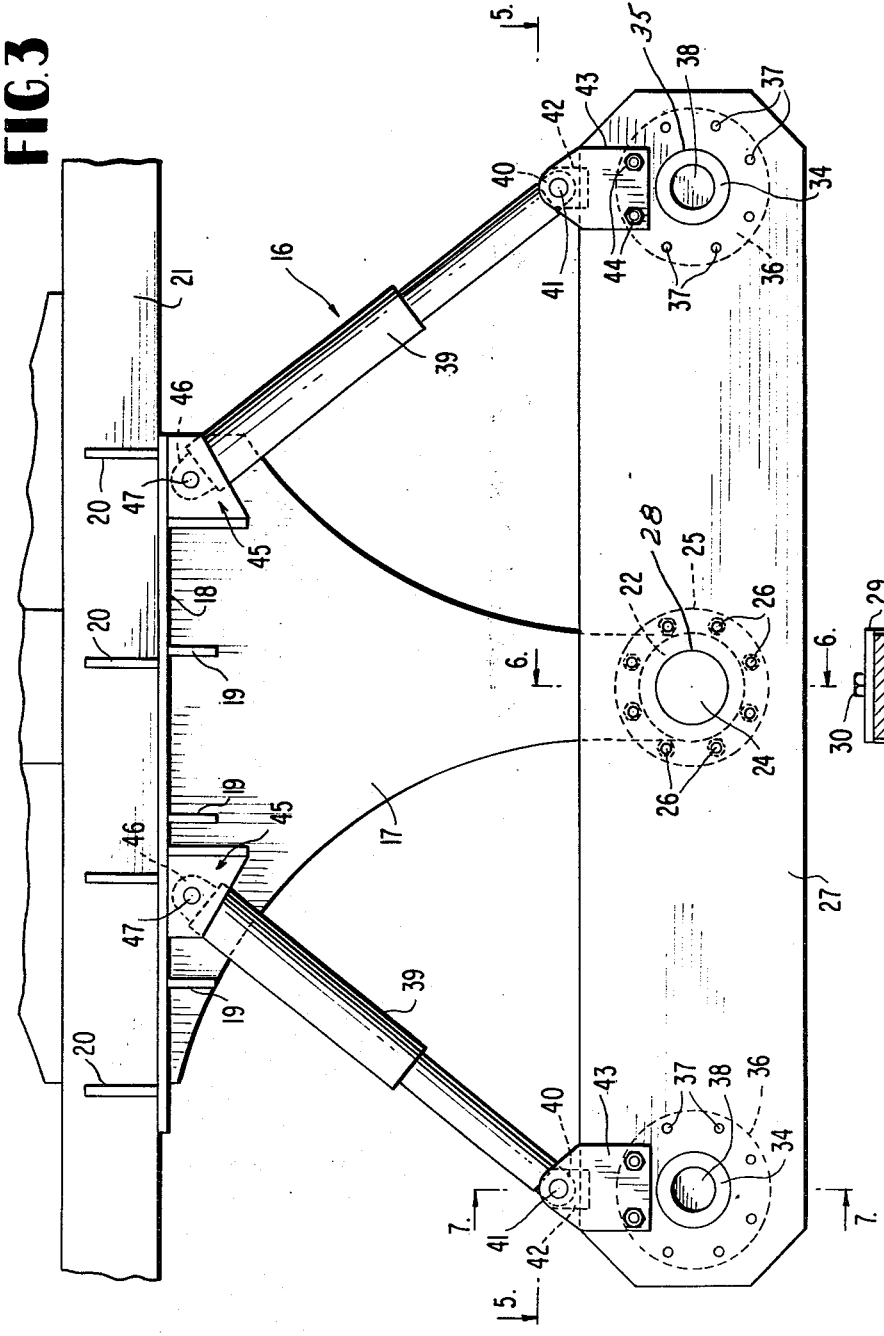
FIG.3
FIG.5

REAR WHEEL SUSPENSION SYSTEM FOR STRADDLE CARRIERS

BACKGROUND OF THE INVENTION

Straddle carriers or trailers of the type used to transport large bin boxes of fruit on roadways are well known, and some examples of the patented prior art are shown in U.S. Pat. Nos. 2,982,430; 2,862,635, and 3,031,203. Since the straddle carriers must be open between their rear wheel assemblies to allow a clear longitudinal passage for the load to enter into engagement with lifting means on the carrier, special problems and requirements are encountered in suspending the rear carrier wheels. Customarily, the rear wheels are tandemly arranged near the rear end of the carrier frame and heavy longitudinal leaf spring arrangements are utilized between the rear wheel axles and vertical posts which are joined with or constitute parts of the carrier main frame. To obtain adequate strength and stability, the prior art arrangements tend to be very heavy and quite costly and also somewhat complicated and they afford less than the ideal operational characteristics in the wheel suspensions.

With the above problems in mind, the objective of this invention is to provide a greatly improved, more efficient, lighter weight and less expensive rear wheel suspension for straddle carriers which will have increased strength and load cushioning ability without complex springing arrangements or numerous mechanical parts. The major load bearing elements are welded and require no adjusting. A pair of fore and aft angled shock absorbers or shock struts of any preferred type are connected at their tops with special fabricated holders integrated with the carrier frame and vertical box beams which depend from such frame. The resulting construction is compact and allows increased freedom of movement of the tandem wheel pairs in relation to ground surface irregularities.

Other features and advantages of the invention will become apparent during the course of the following description.

BRIEF DESCRIPTION OF THE DRAWINGS

FIG. 1 is a side elevation of a straddle carrier or trailer equipped with the rear wheel suspension according to the invention.

FIG. 2 is a rear end elevation of the invention and straddle carrier.

FIG. 3 is an enlarged fragmentary vertical section, partly in elevation, taken on line 3—3 of FIG. 2.

FIG. 4 is an end elevation of the suspension as viewed in FIG. 3.

FIG. 5 is a horizontal section taken on line 5—5 of FIG. 3.

FIG. 6 is an enlarged fragmentary vertical section taken on line 6—6 of FIG. 3.

FIG. 7 is a similar section taken on line 7—7 of FIG. 3.

DETAILED DESCRIPTION

Referring to the drawings in detail wherein like numerals designate like parts, the numeral 10 designates a straddle carrier or trailer in its entirety of the general type disclosed in the aforementioned prior patents. Briefly, the straddle carrier 10 embodies a rigid inverted U-shaped main frame including spaced vertical sides 11 and a horizontal top 12 interconnecting said sides, the bottom of the carrier frame being open so that it may pass longitudinally over cargo to be lifted and transported by vertically movable power operated lifting beams 13 and associated vertical arms 14 which are laterally swingable within limits. The general construction and mode of operation of the straddle carrier 10 is well known in the prior art and therefore need not be described in further detail herein for a proper understanding of the invention.

The invention, as stated, is an improved mounting or suspension for the rear paired tandem wheels 15 at opposite sides of the carrier 10 near its rear end. Since the wheel suspension means on opposite sides of the carrier is identical, a full description of one suspension unit will serve to describe both.

Each rear wheel suspension unit 16 embodying the invention comprises a vertical downwardly tapering box frame 17 constructed of welded plate stock for rigidity and lightness. The vertical box frame 17 has a top cap plate 18 rigid therewith and having spaced vertical gussets 19 joined with the inner side of the box frame below the cap plate, FIG. 3, similar spaced gussets 20 above the cap plate 18 being joined therewith and also joined to the horizontal longitudinal lower frame member 21 of the straddle carrier.

At its lower end, the depending box frame 17 has a horizontal transverse axis sleeve 22 welded thereto and projecting somewhat laterally inwardly thereof, FIGS. 4 and 6. This sleeve 22 contains a pair of axially spaced bushings 23 for the rotational support of a short trunnion shaft 24 to which is welded an annular radial flange plate 25 at the inner end of the sleeve 22 and near and outwardly of the inner end of the trunnion shaft 24. As shown in FIGS. 3 and 6, the flange plate 25 is securely attached by circumferentially spaced screws 26 to a longitudinally extending walking beam 27 having an opening 28 at its longitudinal center for the reception of the interior end portion of the trunnion shaft 24. The walking beam 27 extends equidistantly fore and aft of the axis of trunnion shaft 24 about which the walking beam can rock vertically. When the screws 26 are tightened, the walking beam 27 has its outer vertical face pulled into abutment with the flange plate 25 which is welded onto the trunnion shaft. An end cap 29 is secured by screws 30 to the outer end of the trunnion shaft 24 and this cap bears slidably on the adjacent end of the stationary sleeve 22 and rotates with the trunnion shaft 24, flange plate 25 and walking beam 27 relative to the sleeve 22. The end cap 29 serves as a thrust bearing to restrict axial movements of the parts in the trunnion shaft assembly.

At opposite ends of walking beam 27, axle assemblies 31 for the rear tandem wheels 15 are secured to the walking beam as follows. Each axle assembly 31 has an exterior axle spindle 32 on which one of the wheels 15 is mounted for free rotation in a conventional manner. A flange 33 of the spindle 32 is welded to an outwardly extending sleeve 34 which is received in an opening 35 of the walking beam 27, as shown in FIG. 7. A circular flange plate 36 is welded to the sleeve 34 and secured fixedly to the outer face of walking beam 27 by circumferentially spaced screws 37. An inner extension 38 of axle spindle 32 is welded inside of the sleeve 34 and to the flange 33, as indicated, to complete a very strong axle unit or assembly.

The rear wheel suspension unit further comprises a pair of angled upwardly converging shock absorbers or struts 39, such as hydraulic or air shock absorbers or spring and cable mechanical struts, if preferred. In this connection, the invention is versatile in its ability to accept various types of shock struts with equal facility.

The lower terminals 40 of shock absorbers 39 are connected through pivot elements 41, FIG. 5, to apertured lugs 42 and 43 on the inner and outer faces of the walking beam 27, respectively. The lugs 42 are welded to the walking beam while the lugs 43 are secured thereto by bolts 44 which also pass through a pair of the apertures in flange plate 36, FIGS. 3 and 7. The lower terminals 40 of the inclined shock absorbers are thus pivotally connected to the ends and top of the walking beam 27 between the pairs of apertured lugs 42 and 43.

Sturdy fabricated plate holders 45 for the upper ends of the shock absorbers 39 are also provided and are welded to the inner sides of vertical box beams 17 and to the bottoms of cap plates 18, FIGS. 3 and 4. The holders 45 are open at their bottoms to receive the upper terminals 46 of the shock absorbers, which terminals are connected to horizontal cross pins 47 within the holders 45. The connection is strong and the opposite ends of the two angled shock absorbers are solidly held.

It can now be seen that each rear wheel suspension unit is strong and compact and the need for heavy and cumbersome leaf springs is avoided. The ability of the walking beam 27 to rock on the axis of the trunnion shaft 24, coupled with the snubbing action of the two shock absorbers, allows maximum freedom of movement of the rear wheels 15 when passing over ground irregularities without transmitting shocks to the carrier frame and without damaging the suspension. Compared to the prior art, the invention is relatively lightweight and less expensive to manufacture and install and, once properly installed, the suspension requires practically no maintenance beyond customary lubrication of wheel bearings, not shown, and occasional servicing or replacement of shock struts. The advantages of the invention should now be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a straddle carrier having laterally separated rear tandem wheel pairs, wheel suspension units for each tandem wheel pair, each suspension unit comprising a vertical support beam depending from a lower longitudinal frame member of the carrier, a longitudinal walking beam rockably mounted on the lower end of said vertical support beam on a transverse rocking axis, wheel axle assemblies secured to opposite ends of the walking beam and extending transversely thereof, tandemly arranged ground wheels on said axle assemblies, and a pair of opposing shock absorbers connected between opposite end portions of the walking beam and the top of said vertical support beam, and said walking beam being rockably mounted on the lower end of said support beam at the longitudinal center of said walking beam by a trunnion assembly, said trunnion assembly comprising a horizontal axis transverse sleeve fixedly secured to the lower end of said vertical support beam, a trunnion shaft journaled in said sleeve, a flange plate fixed to the trunnion shaft, fastener means securing the flange plate to the outer side of the walking beam, and an end cap secured to the outer end of the trunnion shaft and rotating therewith and overlapping the outer end of said sleeve.

2. In a straddle carrier as defined in claim 1, sleeve bearing means in said sleeve rotatably supporting said trunnion shaft, the trunnion shaft extending axially inwardly of said flange plate, the walking beam having an opening receiving the inner end portion of said trunnion shaft, and fastener means detachably securing said end cap to the outer end of said trunnion shaft.

3. In a straddle carrier as defined in claim 1, and said wheel axle assemblies each comprising an axle spindle, an inner end sleeve part on said axle spindle, a flange plate fixed to and surrounding said sleeve part, fastener means securing said flange plate solidly and detachably to the outer face of the walking beam, and the sleeve part extending axially inwardly of the flange plate and being received within a transverse opening in the walking beam.

* * * * *